United States Patent [19]

Cosgrove

[11] Patent Number: 5,055,548

[45] Date of Patent: Oct. 8, 1991

[54] SOVLENT-BORNE ALKYD RESIN COMPOSITIONS

[75] Inventor: John P. Cosgrove, Charleston, S.C.

[73] Assignee: Westvaco Corporation, New York, N.Y.

[21] Appl. No.: 597,333

[22] Filed: Oct. 11, 1990

[51] Int. Cl.$^5$ .............................................. C08G 63/52
[52] U.S. Cl. .................................. 528/272; 528/295.3; 528/295.5; 528/302; 528/303; 528/307; 528/308; 528/308.6; 528/392
[58] Field of Search .................. 528/272, 295.3, 295.5, 528/302, 303, 307, 308, 308.6, 392

[56] References Cited

U.S. PATENT DOCUMENTS 3,753,968  8/1973  Ward ................................... 260/97.6
3,953,479  4/1976  Force et al. .......................... 549/557
4,447,567  5/1984  Geerdes et al. ...................... 523/501

OTHER PUBLICATIONS

S. L. Kangas et al., "Binders For Higher-Solids Coatings Part 1:Synthesis of Model Alkyd Resins", J.C.T., vol. 59, No. 744, 1/87, pp. 89–97.

"Pamolyn ® 380 Conjugated Linoleic Acid", Hercules Incorporated Technical Information Bulletin Number 7046-10.

"Westvaco Diacid ® 1550 and 1595 Dicarboxylic Acids", Westvaco Chemical Division Product Data Bulletin, May 1990.

Primary Examiner—John Kight, III
Assistant Examiner—Sam A. Acquah
Attorney, Agent, or Firm—Daniel B. Reece, IV; Terry B. McDaniel; R. L. Schmalz

[57]    ABSTRACT

Solvent-borne alkyd resin compositions are disclosed comprising a 21-carbon dicarboxylic acid. Substitution of the dibasic carboxylic acid component of the composition with this 21-carbon dicarboxylic acid permits a reduction in the viscosity of the resin without decreasing the average molecular weight of the resin.

13 Claims, No Drawings

SOVLENT-BORNE ALKYD RESIN COMPOSITIONS

FIELD OF INVENTION

The invention relates to a novel composition of matter for reducing the volatile organic compound levels of solvent-borne coatings. In particular, this invention relates to a novel composition of matter that has been found to significantly reduce the viscosity of a resin without decreasing the average molecular weight of the resin. The invention composition permits the formulation of coating films with improved properties such as dry time, hardness, and impact resistance.

BACKGROUND OF THE INVENTION

One of the first applications of synthetic polymer synthesis in coatings technology was the alkyd resin. It was successful in chemically combining oil or oil-derived fatty acids into a polyester polymer structure, thereby enhancing the mechanical properties of these coating vehicles over those of the oils alone.

A typical alkyd resin is a polyester made by reacting an unsaturated fatty acid, a dibasic carboxylic acid, and a polyol. Usually, the dibasic acid is phthalic anhydride or isophthalic acid, and the polyol is trifunctional. The reaction of the dibasic carboxylic acid with the polyol produces the backbone of the polyester, thereby building its molecular weight. In turn, the fatty acid groups attach to this backbone and, in the presence of oxygen and a metal catalyst, serve to cure the resin into the final crosslinked film.

Resins are typically classified by the amount of fatty acid that they contain, i.e. their "oil length". The oil length of an alkyd is defined as the weight of any fatty acid present plus the weight of the polyol needed to completely esterify this fatty acid (minus the weight of evolved water from the esterification), expressed as a percentage of the total weight of the finished resin. Oil length (OL) is divided into three classes: short-, medium-, and long-oil. A medium-oil alkyd contains between 45 to 55% oil, with short-oil alkyds containing less and long-oil alkyds containing more oil. Long-oil and medium-oil lengths are commonly used in brush-applied solvent-based decorative coatings, while short-oil alkyds are found in automotive and general industrial stoving compositions.

Traditionally, solvent-based alkyds have obtained their good film properties by a combination of high resin molecular weights coupled with drying from pendant, unsaturated fatty acids present in the alkyd. While contributing to desirable film properties, the high molecular weight of the resin also causes the resin to have an unsuitably high viscosity . . . thus necessitating low-solids formulations for coating applications. Due to environmental concerns and increasing governmental regulations on the volatile organic content (VOC) of coatings, coating producers are attempting to find alternatives to these conventional low-solids level, solvent-based formulations.

One approach to address the VOC regulations is the development of water-based formulations. While the use of water as a solvent is attractive, it has proven difficult to obtain the properties and performance of a solvent-based coating via a water-based system. These developmental problems are especially pronounced in the areas of high gloss and corrosion resistance.

The other primary approach to the VOC regulations has been to reduce the amount of volatile organic solvent necessary for a formulation by reducing the average molecular weight of the alkyd resin. A reduction in molecular weight, while reducing resin viscosity and allowing an increased solids level coating to be feasible, also has proven deleterious to the properties of the final coating. This so-called high-solids approach involves developing resins that are soluble in organic solvents at levels as high as 90 to 95 weight percent solids. These high-solids levels must be attained while maintaining a low viscosity to allow for formulation and application of the coating.

Therefore, it is the object of this invention to have an alkyd composition that addresses environmental concerns by significantly reducing the viscosity of a resin without decreasing the average molecular weight of the resin. In addition, organic solvents are frequently expensive and any means of reducing their presence could lead to lower costs for coatings.

SUMMARY OF THE INVENTION

The object of the invention is met by the use of a 21-carbon aliphatic branched-chain dibasic acid in the solvent-based alkyds. This dibasic acid, when polymerized into the backbone of a alkyd resin, reduces significantly the viscosity of the resin compared to similar, unmodified resins. This viscosity reduction can be attained without decreasing the average molecular weight of the resin. In fact, resins with lower viscosities and higher molecular weights can be produced by partially substituting this dibasic acid for the typically used phthalic anhydride. The increased molecular weights of the modified resins result in films with improved properties such as dry time, hardness, and impact resistance.

DESCRIPTION OF THE PREFERRED EMBODIMENTS

It is well known in the art to react an unsaturated fatty acid, a dibasic carboxylic acid, and a polyol to produce an alkyd resin, as shown in "Binders for Higher-Solids Coatings Part 1: Synthesis of Model Alkyd Resins," S. L. Kangas and F. N. Jones, *Journal of Coatings Technology*, Vol. 59, No. 744, January 1987, pp. 89–97, which is hereby incorporated by reference.

Unsaturated fatty acids which are suitable for use in the reaction include, but are not limited to, the following:
tall oil
soybean oil
tung oil
linseed oil
linoleic acid
linolenic acid.

Polyols which are suitable for use in the reaction include, but are not limited to, the following:
1,4-butanediol
ethylene glycol
propylene glycol
neopentyl glycol
glycerol
trimethylolethane
trimethylolpropane
pentaerythritol.

Dibasic carboxylic acids which are suitable for use in the reaction include, but are not limited to, the following:
phthalic anhydride ortho-phthalic acid
tere-phthalic acid
maleic anhydride
fumaric acid
azelaic acid
dimer acid.

These lists are intended to be representative and it will be obvious to those skilled in the art that a variety of other acids and polyols can be used. Therefore, other acids and polyols suitable for use in the reaction can be considered part of this invention when used with the described composition of matter below.

The invention that is useful in reducing the viscosity of a resin without decreasing its average molecular weight is produced by replacing 2 to 100% of the standard dibasic carboxylic acid used to make the alkyd resin with a 21-carbon aliphatic branched-chain dibasic acid, hereafter referred to as DIACID. (Westvaco DIACID® 1595 is a tall-oil derivative, sold by Westvaco.) A method for producing the same $C_{21}$ dicarboxylic acid is taught in commonly assigned U.S. Pat. No. 3,753,968, which is hereby incorporated by reference. However, DIACID 1595 is a high-purity version of this $C_{21}$ dicarboxylic acid, and is of a sufficient quality to be utilized in the production of polymers. The chemical structure for DIACID 1595 is shown below:

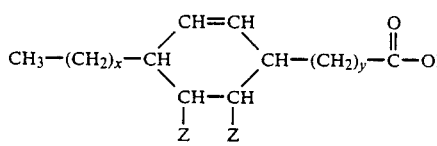

wherein X and Y are integers which when added together equal 12, and Z is a hydrogen (H) while the other Z is a carboxylic acid group (COOH).

The invention composition is useful in reducing the viscosity of long-oil, medium-oil, and short-oil alkyd resins. As appreciated in the art, the exact components and properties of components desired for any coating application can vary, and, therefore, routine experimentation may be required to determine the optimal components and proportions of components for a given application and desired properties.

The following examples are provided to further illustrate the present invention and are not to be construed as limiting the invention in any manner.

EXAMPLE 1

A standard medium-oil alkyd resin, made from PAMOLYN® 200 (a tall-oil derived, unsaturated fatty acid containing 78% linoleic acid, made by Hercules), phthalic anhydride (PA), and trimethylol propane (TMP) was produced based on a formulation given in the above referenced article by S. L. Kangas and F. N. Jones (Alkyd No. T-7-C on p. 91). A series of modified resins were created by substituting, on an equivalents basis, DIACID for a given percentage of the PA used in the standard resin.

All alkyds were prepared by a conventional solvent procedure as illustrated by preparation of the 25% DIACID modified resin. PAMOLYN® 200 (50.00 g, 0.173 mol), PA (23.12 g, 0.156 mol), DIACID (18.31 g, 0.052 mol), TMP (28.88 g, 0.213 mol) and xylenes (8.0 g) were charged into a 250-ml three neck round-bottom flask equipped with a Dean-Stark trap and cold water condenser, a heating mantle, a thermometer, a nitrogen inlet and a mechanical stirrer. Lithium ricinoleate, at 0.1% based on the fatty acid present, was used as a catalyst for all the resin preparations. The mixture was heated to 175° C., under nitrogen, and the temperature was increased 10° C. every 30 minutes until a top temperature of 240° C. was reached. This temperature was maintained until an acid number of approximately ten was attained. The resins were cooled, poured into glass jars and stored under nitrogen.

TABLE I

| Medium-Oil Alkyd Resin Formulations | | | | |
|---|---|---|---|---|
| Descript | Ingred | Weight | Equiv | Moles |
| TMP Std. | Pam 200 | 90.00 | .311 | .311 |
| | P.A. | 56.94 | .768 | .384 |
| | DIACID | 0.00 | .000 | .000 |
| | TMP | 53.06 | 1.171 | .390 |
| 5% D | Pam 200 | 90.00 | .311 | .311 |
| | P.A. | 54.06 | .730 | .365 |
| | DIACID | 6.76 | .038 | .019 |
| | TMP | 53.06 | 1.171 | .390 |
| 10% D | Pam 200 | 50.00 | .173 | .173 |
| | P.A. | 27.74 | .374 | .187 |
| | DIACID | 7.33 | .042 | .021 |
| | TMP | 28.88 | .638 | .213 |
| 15% D | Pam 200 | 90.00 | .311 | .311 |
| | P.A. | 48.37 | .653 | .326 |
| | DIACID | 20.24 | .115 | .058 |
| | TMP | 53.06 | 1.171 | .390 |
| 25% D | Pam 200 | 50.00 | .173 | .173 |
| | P.A. | 23.12 | .312 | .156 |
| | DIACID | 18.31 | .104 | .052 |
| | TMP | 28.88 | .638 | .213 |
| 50% D | Pam 200 | 50.00 | .173 | .173 |
| | P.A. | 15.41 | .208 | .104 |
| | DIACID | 36.61 | .208 | .104 |
| | TMP | 28.88 | .638 | .213 |
| 100% D | Pam 200 | 75.00 | .260 | .260 |
| | P.A. | 0.00 | .000 | .000 |
| | DIACID | 112.32 | .638 | .319 |
| | TMP | 43.97 | .971 | .324 |

TABLE II

| Middle-Oil Alkyd Resin Constants | | | | | | | | |
|---|---|---|---|---|---|---|---|---|
| DESCRIPTION | K | $F_{AV}$ | OL | AOL | R | RUN TIME | FINAL A NO. | FINISHED WEIGHT | WATER OFF |
| Std. | 1.006 | 2.05 | .53 | .53 | 1.08 | 8.0 | 12 | 187.48 | 12.52 |
| 5% D | 1.006 | 2.05 | .52 | .56 | 1.09 | 9.0 | 10 | 191.02 | 12.86 |
| 10% D | 1.008 | 2.04 | .51 | .59 | 1.08 | 15.5 | 6 | 106.71 | 7.23 |
| 15% D | 1.006 | 2.05 | .50 | .62 | 1.09 | 12.0 | 10 | 198.12 | 13.55 |
| 25% D | 1.008 | 2.04 | .49 | .68 | 1.08 | 11.0 | 7 | 112.52 | 7.79 |
| 50% D | 1.008 | 2.04 | .45 | .80 | 1.08 | 9.5 | 10 | 122.17 | 8.73 |
| 100% D | 1.005 | 2.05 | .38 | .98 | 1.08 | 10.0 | 12 | 215.13 | 16.16 |

The standard and modified medium-oil resin formulations are given in Table I. Table II contains a series of parameters which can be used to help predict the final properties of the alkyd resins. These parameters were kept as constant as possible in each of the formulations so that the resins being compared would be as similar as possible. K is the alkyd constant, equal to the total moles of starting material divided by the total equivalents of acid present. To obtain a satisfactory resin this value should be 1.0 ±0.05. $F_{av}$ is the average functionality of the alkyd and is equal to the total equivalents of starting material divided by the total moles of starting material. OL is the oil length of the resin as explained earlier and AOL is the adjusted oil length. The AOL was determined by including the amount of DIACID added to the formulation in the OL calculation. R is the ratio of total OH groups from the polyol to total acid groups present in the starting material. The next two columns are the length of time (in hours) for the reaction and the final acid number of the resin, respectively. The ninth column gives the weight (in grams) of the finished resin. The final column gives the weight (in grams) of the evolved water from the reaction.

Once prepared, the resins were reduced to 50% solids in mineral spirits so that films could be made and evaluated. The resin viscosity versus solids content, in mineral spirits and xylenes, was also tested (see Table IV below). A combination of three metal driers (calcium, cobalt, and zirconium) was added to the diluted resins. The driers were added at levels of 0.05% Ca, 0.05% Co, and 0.3% Zr (based on the resin solids weights) to the 50% solids resins and allowed to sit overnight before the films were drawn down. No other additives were used. Films were cast on both steel and aluminum panels using a draw down bar at a wet film thickness of 2 mls. The films were dried for one week at ambient conditions before any evaluations were performed, except for the 24 hour hardness determinations.

The alkyd resin film evaluations are shown in Table III below. Dry times were reported both as dry-to-touch and also for a 300 g Zapon test. Hardness was determined using the standard pencil test after one day, and again after seven days. Impact resistance, both direct and reverse, was tested with a Gardner Impact Tester on steel panels. The Mandrel Flexibility and the cross-hatch adhesion tests were performed on aluminum panels, with the cross-hatch adhesion tests being done in duplicate.

DIACID level. However, while the dry times are still quite good at the 15 to 25% DIACID substitution level, the film hardness decreases. This is probably due to the fatty nature of the DIACID acting as a plasticizer, thereby making the film softer and more flexible. This plasticizing effect also can be seen in the results from the impact resistance tests. The standard resin failed the reverse impact test at 100 inch/pounds while all of the modified resins were still intact at 160 inch/pounds, the limit of the test. As would be expected for a medium-oil length alkyd, the flexibility and adhesion are excellent in all cases.

Two solvents, xylenes and mineral spirits, were used to determine the viscosity of the resin as a function of the solids level. All viscosity data were collected at 25° C using a Brookfield viscometer, and are the average of three determinations. Table IV gives the viscosity data for the evaluated resins. The data demonstrate a decrease in resin viscosity corresponding to the increasing DIACID content of the alkyd. In fact, the modified resins which were evaluated in mineral spirits are all less viscous than the standard resin at all solids levels.

TABLE IV

| DES-CRIPTION | SOL-VENT | ALKYD RESIN VISCOSITIES (cps) SOLIDS LEVEL (Wt/Wt) | | | | |
|---|---|---|---|---|---|---|
| | | 0.9 | 0.8 | 0.7 | 0.6 | 0.5 |
| Standard | Xylenes | — | 3950 | 325 | 90 | 20 |
| | MS | — | 16425 | 4200 | 790 | 155 |
| 5% DIACID | Xylenes | 14200 | 2025 | 325 | 65 | 20 |
| | MS | 37050 | 7683 | 1600 | 325 | 70 |
| 10% DIACID | Xylenes | — | 2150 | 450 | 115 | 30 |
| | MS | — | 9601 | 2350 | 503 | 90 |
| 15% DIACID | Xylenes | — | 1392 | 318 | 85 | 20 |
| | MS | — | 3450 | 897 | 255 | 75 |
| 25% DIACID | Xylenes | 17550 | 2600 | 525 | 205 | 60 |
| | MS | 37250 | 4950 | 1075 | 270 | 90 |
| 50% DIACID | Xylenes | 6200 | 1100 | 275 | 90 | 35 |
| | MS | 6975 | 2417 | 683 | 173 | 40 |
| 100% DIACID | Xylenes | 11850 | 2650 | 550 | 180 | 60 |
| | MS | 14225 | 3200 | 650 | 215 | 65 |

The viscosity of the resins in xylenes follow the same

TABLE III

| | DRY TIMES (min) | | PENCIL HARDNESS* | | IMPACT** | | | |
|---|---|---|---|---|---|---|---|---|
| DESCRIPTION | Touch | Zapon | 1 Day | 7 Day | Direct | Reverse | FLEX** | ADHES*** |
| Standard | 80 | 80 | B | B | >160 | 100 | >32% | 100/100 |
| 5% DIACID | 85 | 85 | B | B | >160 | >160 | >32% | 100/84 |
| 10% DIACID | 45 | 45 | F | H | >160 | >160 | >32% | 100/100 |
| 15% DIACID | 60 | 60 | H | 2H | >160 | >160 | >32% | 100/100 |
| 25% DIACID | 65 | 65 | B | B | >160 | >160 | >32% | 100/100 |
| 50% DIACID | 55 | 45 | B | 2H | >160 | >160 | >32% | 100/100 |
| 100% DIACID | 115 | 110 | F | H | >160 | >160 | >32% | 100/100 |

*Series in order of increasing hardness: 6B to 1B, HB, F, H to 6H.
**160 lbs/in and 32% are the maximum limits of the impact resistance and Mandrel Flexibility texts, respectively
***Cross-hatch adhesion test with a maximum of 100 squares The dry times for the alkyds were quite good, which is to be expected for a conventional alkyd prepared with a high linoleic acid content fatty acid such as PAMOLYN ® 200. The resins cure to give fairly tough, hard films, ranging from a one day pencil hardness of B for the standard resin to H for the 15% DIACID modified resin. The hardness data also reflects that the resins cure quite rapidly. In most cases the seven-day pencil hardness is not appreciably different from the one-day value, which is to be anticipated for a conventional alkyd made with linoleic rich fatty acid.

Incorporation of the DIACID generally improves the dry time and the hardness up to about the 15% general trend as seen in mineral spirits, although the magnitude of the viscosity decrease with the increasing DIACID content is not as great. This viscosity dependence on solvent polarity is a consequence of the highly aliphatic nature of the DIACID molecule. Incorporation of this molecule into the backbone of the alkyd makes the resin more soluble in the non-polar solvents.

These decreases in viscosity were achieved without reducing the average molecular weight of the resin, as shown by gel permeation chromatographic (GPC) analysis. The increased molecular weight of the resins contributed to the good film properties that are seen from the data in Table III.

EXAMPLE 2

Following the procedure outlined in Example 1, a standard alkyd resin and a 25% DIACID modified alkyd resin were produced where a molar equivalent of pentaerythritol (PE) and benzoic acid (BA) was substituted for 50% of the TMP used in the Example 1 resins.

These resins were evaluated via the methods of Example 1, and the results are shown in the tables below.

TABLE V

PE/BA Modified Alkyd Resin Formulations

| Descript | Ingred | Weight | Equiv | Moles |
|---|---|---|---|---|
| PE/BA STD | Pam 200 | 45.00 | .156 | .156 |
| | BA | 11.90 | .097 | .097 |
| | P.A. | 28.47 | .384 | .192 |
| | DIACID | 0.00 | .000 | .000 |
| | TMP | 13.25 | .292 | .097 |
| | PE | 13.85 | .390 | .098 |
| 25% D | Pam 200 | 50.00 | .173 | .173 |
| | BA | 13.00 | .106 | .106 |
| | P.A. | 23.12 | .312 | .156 |
| | DIACID | 18.72 | .106 | .053 |
| | TMP | 14.47 | .319 | .106 |
| | PE | 15.12 | .426 | .106 |

TABLE VI

PE/BA Modified Alkyd Resin Constants

| DESCRIPTION | K | $F_{AV}$ | OL | R | RUN TIME | FINAL A NO. | FINISHED WEIGHT | WATER OFF |
|---|---|---|---|---|---|---|---|---|
| Std. PE/BA | 1.005 | 2.03 | .46 | 1.07 | 6.0 | 10 | 106.21 | 6.26 |
| 25% D | 1.005 | 2.03 | .43 | 1.07 | 9.0 | 10 | 126.59 | 7.84 |

TABLE VII

PE/BA Modified Alkyd Resin Properties

| DESCRIPTION | DRY TIMES (min) | | PENCIL HARDNESS | | IMPACT | | FLEX | ADHESION |
|---|---|---|---|---|---|---|---|---|
| | Touch | Zapon | 1 Day | 7 Day | Direct | Reverse | | |
| Std. PE/BA | 65 | 65 | H | 2H | 20 | <10 | >32% | 100/100 |
| 25% DIACID | 160 | 75 | F | H | 140 | 30 | >32% | 100/100 |

The plasticizing nature of the DIACID is even more evident in the benzoic acid modified resins. These resins were formulated to improve the film hardness by incorporating a combination of pentaerythritol and benzoic acid (PE/BA). As the data in Table VII show, these films have good dry times and are somewhat harder than the corresponding resins shown in Table III of Example 1. However, these resins produce films that are quite brittle as demonstrated by the impact resistance results. The standard PE/BA resin failed at 20 and less than 10 inch/pounds under direct and reverse impact, respectively. This is considerably lower than the 160 and 100 inch/pounds, direct and reverse, that the straight phthalic anhydride and TMP resin withstood. Incorporation of 25% DIACID into the standard PE/BA resin improved the impact resistance to 140 and 30 inch/pounds, front and reverse while still maintaining good hardness. Flexibility and adhesion are still excellent for both of the PE/BA modified resins.

TABLE VIII

PE/BA Modified Alkyd Resin Viscosities

| DES-CRIPTION | SOL-VENT | SOLIDS LEVEL (Wt/Wt) | | | | |
|---|---|---|---|---|---|---|
| | | 0.9 | 0.8 | 0.7 | 0.6 | 0.5 |
| Standard w/PE/BA | Bu Ac | 47400 | 2800 | 200 | 64 | 24 |
| | MS | 403200 | 107200 | 29400 | 5600 | 1065 |
| 25% DIACID w/PE/BA | Bu Ac | 21800 | 2600 | 520 | 140 | 56 |
| | MS | 56000 | 18800 | 4600 | 1200 | 340 |

Butyl acetate and mineral spirits were used in the viscosity evaluation. Again, a decrease in resin viscosity can be seen with the increasing DIACID content. However, the viscosity decrease is dependent upon the polarity of the solvent due to the aliphatic nature of the DIACID molecule. Thus, the difference in viscosity is not as great when the resins are dissolved in the more polar butyl acetates.

EXAMPLE 3

A series of standard and DIACID modified long-oil alkyd resins were produced and evaluated by the methods outlined in Example 1. The results are shown in the tables below.

TABLE IX

Long-Oil Alkyd Resin Formulations

| Description | Ingred | Weight | Equiv | Moles |
|---|---|---|---|---|
| TMP Std. | L-1AS | 71.25 | .247 | .247 |
| | PA | 26.26 | .354 | .177 |
| | DIACID | 0.00 | .000 | .000 |
| | TMP | 27.49 | .607 | .202 |
| TMP/15% D | L-1AS | 71.25 | .247 | .247 |
| | PA | 22.32 | .301 | .151 |
| | DIACID | 9.36 | .053 | .027 |
| | TMP | 27.49 | .607 | .202 |
| TMP/25% D | L-1AS | 71.25 | .247 | .247 |
| | PA | 19.69 | .266 | .133 |
| | DIACID | 15.59 | .089 | .044 |
| | TMP | 27.49 | .607 | .202 |
| TMP/50% D | L-1AS | 71.25 | .247 | .247 |
| | PA | 13.13 | .177 | .089 |
| | DIACID | 31.18 | .177 | .089 |
| | TMP | 27.49 | .607 | .202 |
| PE Std. | L-1AS | 114.00 | .394 | .394 |
| | PA | 40.95 | .553 | .276 |
| | DIACID | 0.00 | .000 | .000 |
| | PE | 33.80 | .994 | .249 |
| PE/15% D | L-1AS | 114.00 | .394 | .394 |
| | PA | 34.82 | .470 | .235 |
| | DIACID | 14.59 | .083 | .041 |
| | PE | 33.80 | .994 | .249 |
| PE/25% D | L-1AS | 114.00 | .394 | .394 |
| | PA | 30.72 | .415 | .207 |
| | DIACID | 24.32 | .138 | .069 |
| | PE | 35.29 | .994 | .249 |
| PE/50% D | L-1AS | 75.40 | .261 | .261 |

TABLE IX-continued

Long-Oil Alkyd Resin Formulations

| Description | Ingred | Weight | Equiv | Moles |
|---|---|---|---|---|
| | PA | 13.25 | .179 | .089 |
| | DIACID | 31.46 | .179 | .089 |
| | PE | 23.02 | .648 | .162 |

L-1AS A tall oil derived fatty acid containing roughly equivalent amounts of oleic and linoleic acid, and less than .5% rosin acid, made by Westvaco.
PA Phthalic anhydride
DIACID DIACID 1595 (D)
TMP Trimethylolpropane
PE Pentaerythritol

TABLE X

Long-Oil Alkyd Resin Constants

| RESIN DESCRIPTION | K | $F_{AV}$ | OL | R | RUN TIME | FINAL A NO. | FINISHED WEIGHT | WATER OFF |
|---|---|---|---|---|---|---|---|---|
| TMP/Std | 1.042 | 1.93 | .66 | 1.01 | 10.0 | 10 | 117.37 | 7.63 |
| TMP/15% D | 1.042 | 1.93 | .64 | 1.01 | 8.5 | 10 | 122.31 | 8.11 |
| TMP/25% D | 1.042 | 1.93 | .62 | 1.01 | 8.5 | 10 | 125.60 | 8.42 |
| TMP/50% D | 1.042 | 1.93 | .58 | 1.01 | 8.5 | 11 | 133.83 | 9.22 |
| PE Std | .971 | 2.09 | .68 | 1.05 | 11.5 | 10 | 176.68 | 12.08 |
| PE/15% D | .971 | 2.09 | .66 | 1.05 | 12.0 | 10 | 184.39 | 12.82 |
| PE/25% D | .971 | 2.09 | .63 | 1.05 | 11.0 | 10 | 191.01 | 13.32 |
| PE/50% D | .973 | 2.08 | .60 | 1.05 | 8.5 | 11 | 133.68 | 9.53 |

TABLE XI

Long-Oil Alkyd Film Properties

| | DRY TIMES (min) | | HARDNESS | | | | IMPACT | | | |
|---|---|---|---|---|---|---|---|---|---|---|
| | | | PENCIL | | SWARD | | | | | |
| DESCRIPTION | Touch | Zapon | 1 Day | 7 Day | 1 Day | 7 Day | Front | Reverse | Flex | Adhes. |
| Std. TMP | >360 | >360 | <4B | >4B | 2 | 4 | >160 | >160 | >32% | 100/100 |
| 15% D. TMP | >360 | 230 | <4B | <4B | 2 | 6 | >160 | >160 | >32% | 100/100 |
| 25% D. TMP | >360 | 300 | 3B | 2B | 2 | 4 | >160 | >160 | >32% | 100/100 |
| 50% D. TMP | >360 | 230 | <4B | <4B | 2 | 4 | >160 | 110 | >32% | 100/100 |
| Std. PE | 180 | 100 | HB | F | 9 | 10 | >160 | >160 | >32% | 100/100 |
| 15% D. PE | 230 | 135 | 2B | 2B | 6 | 10 | >160 | >160 | >32% | 100/99 |
| 25% D. PE | 195 | 85 | 2B | B | 6 | 10 | >160 | >160 | >32% | 100/97 |
| 50% D. PE | 210 | 90 | 2B | B | 6 | 8 | >160 | >160 | >32% | 97/99 |

Long-oil resins tend to produce soft films due to the large amount of fatty acid present. The dry times and properties of the DIACID modified resins tended to be similar to, or better than, the standard resins.

TABLE XII

Long-Oil Resin Viscosities

| DESCRIPTION | SOLVENT | SOLIDS LEVEL | | | | |
|---|---|---|---|---|---|---|
| | | .9 | .8 | .7 | .6 | .5 |
| Std. TMP | Xylenes | 600 | 135 | 50 | 20 | 10 |
| | MS | 750 | 215 | 85 | 35 | 18 |
| 15% D. TMP | Xylenes | 480 | 100 | 64 | 24 | 4 |
| | MS | 640 | 200 | 88 | 32 | 8 |
| 25% D. TMP | Xylenes | 240 | 60 | 24 | 16 | 4 |
| | MS | 280 | 100 | 48 | 24 | 8 |
| 50% D. TMP | Xylenes | 650 | 165 | 58 | 20 | 10 |
| | MS | 800 | 250 | 90 | 43 | 20 |
| Std. PE | Xylenes | 6925 | 1000 | 180 | 45 | 15 |
| | MS | 15775 | 2700 | 340 | 65 | 20 |
| 15% D. PE | Xylenes | 5700 | 795 | 230 | 65 | 15 |
| | MS | 9450 | 1575 | 365 | 95 | 35 |
| 25% D. PE | Xylenes | 5325 | 1100 | 300 | 110 | 40 |
| | MS | 8575 | 2350 | 575 | 170 | 50 |
| 50% D. PE | Xylenes | 3850 | 1050 | 375 | 130 | 40 |
| | MS | 5825 | 1850 | 700 | 225 | 90 |

The viscosity evaluations were done in both mineral spirits and xylenes.

The alkyd resins which did not contain pentaerythritol (PE) showed viscosity decreases with increasing DIACID content, up to about 25% DIACID incorporation. This decrease in viscosity occurs in both solvents.

The alkyd resins which use PE as the polyol have a higher viscosity than the others. The switch from the trifunctional TMP to the tetrafunctional PE increases the viscosity due to more chain branching. Again, the viscosities of the resins decrease with the increasing DIACID content, while the average molecular weights increase.

EXAMPLE 4

A series of standard and DIACID modified short-oil alkyd resins were produced and evaluated by the methods outlined in Example 1. The results are shown in the table below.

TABLE XIII

Short-Oil Alkyd Resin Formulations

| Description | Ingred | Weight | Equiv | Moles |
|---|---|---|---|---|
| Std. | L-1AS | 52.50 | .182 | .182 |
| | PA | 49.44 | .667 | .334 |
| | DIACID | 0.00 | .000 | .000 |
| | TMP | 48.06 | 1.051 | .354 |
| 10% D | L-1AS | 52.50 | .182 | .182 |
| | PA | 44.49 | .600 | .300 |
| | DIACID | 11.74 | .067 | .033 |
| | TMP | 48.06 | 1.061 | .354 |
| 25% D | L1AS | 52.50 | .182 | .182 |
| | PA | 37.08 | .500 | .250 |
| | DIACID | 29.36 | .167 | .083 |
| | TMP | 48.06 | 1.061 | .354 |
| 50% D | L-1AS | 52.50 | .182 | .182 |
| | PA | 24.72 | .334 | .167 |
| | DIACID | 58.71 | .334 | .167 |
| | TMP | 48.06 | 1.061 | .354 |

L-1AS A tall oil derived fatty acid containing roughly equivalent amounts of oleic and linoleic acid, and less than .5% rosin acid, made by Westvaco
PA Phthalic Anhydride
TMP Trimethylolpropane

TABLE XIV

| | Short-Oil Alkyd Resin Constants | | | | | | |
|---|---|---|---|---|---|---|---|
| RESIN DESCRIPTION | K | $F_{AV}$ | OL | R | RUN TIME | FINAL A NO. | FINISHED WEIGHT | WATER OFF |
| STD | 1.024 | 2.13 | .41 | 1.25 | 6.5 | 10 | 140.73 | 9.27 |
| 10% D | 1.024 | 2.13 | .39 | 1.25 | 6.0 | 10 | 146.92 | 9.87 |
| 25% D | 1.024 | 2.13 | .37 | 1.25 | 7.0 | 10 | 156.22 | 10.78 |
| 50% D | 1.024 | 2.13 | .33 | 1.25 | 8.5 | 10 | 171.71 | 12.28 |

TABLE XV

| | Short-Oil Alkyd Film Properties | | | | | | | | |
|---|---|---|---|---|---|---|---|---|---|
| | | | HARDNESS | | | | | | |
| | | | PENCIL | | SWARD | | IMPACT | | |
| DESCRIPTION | Touch | Zapon | 1 Day | 7 Day | 1 Day | 7 Day | Front | Reverse | Flex | Adhesion |
| Std. PA | 255 | 198 | 2B | B | 4 | 14 | 20 | <10 | >32% | 100/100 |
| 10% D, PA | 410 | 395 | 2B | 2B | 8 | 12 | 40 | <10 | >32% | 100/100 |
| 25% D, PA | <360 | 190 | B | HB | 12 | 14 | 60 | 10 | >32% | 100/100 |
| 50% D, PA | >360 | >360 | 2B | B | 4 | 6 | >160 | >160 | >32% | 100/100 |

The resins show reasonable dry times for short-oil alkyds made with tall oil fatty acids. Their softness is also due to the choice of a drying oil which has a relatively large amount of nondrying oleic acid. The big difference between the resins can be seen in the impact resistance results. Short-oil resins, having a high degree of aromatic character, tend to be hard but brittle. This was the case with the standard resin. However, incorporation of DIACID into the backbone of the resin improves the impact resistance . . . and the degree of improvement is related to the amount of DIACID incorporated. Addition of 10% DIACID improves the impact resistance slightly; 25% is somewhat better and the 50% substitution withstands the limit of the test (160 inch/pounds) front and reverse, with the same pencil hardness as the standard resin.

TABLE XVI

| | Short-Oil Alkyd Resin Viscosities | | | | | |
|---|---|---|---|---|---|---|
| DES-CRIPTION | SOL-VENT | SOLIDS LEVEL | | | | |
| | | .9 | .8 | .7 | .6 | .5 |
| Std. PA | Xylenes | 63400 | 6400 | 520 | 140 | 24 |
| | MS | * | 120800 | 58800 | 3400 | 320 |
| 10% D, PA | Xylenes | 32400 | 3600 | 660 | 100 | 24 |
| | MS | 121500 | 36700 | 11950 | 3475 | 1025 |
| 25% D, PA | Xylenes | 12400 | 2400 | 400 | 160 | 32 |
| | MS | 29400 | 8200 | 2400 | 680 | 200 |
| 50% D, PA | Xylenes | 9100 | 1850 | 325 | 90 | 30 |
| | MS | 12850 | 2725 | 800 | 310 | 130 |

*Too viscous to obtain a viscosity value.

Short-oil resins tend to be quite viscous due to their formulations containing large percentages of molecules having an aromatic character. Incorporation of the aliphatic DIACID greatly reduced the viscosities of the modified resins.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A process for the production of a solvent-borne alkyd resin which comprises reacting:

(a) 20 to 70% by weight of an unsaturated fatty acid;
(b) 10 to 50% by weight of a polyol;
(c) 10 to 50% by weight of a dibasic carboxylic acid; and
(d) 10 to 50% by weight of a 21-carbon dicarboxylic acid having the formula

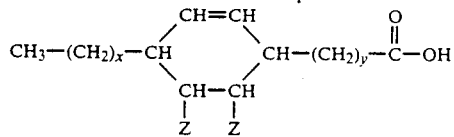

wherein X and Y are integers which when added together equal 12, and Z is a hydrogen (H) while the other Z is a carboxylic acid group (COOH).

2. The process of claim 1 which further comprises reacting:

(a) 30 to 70% by weight of an unsaturated fatty acid;
(b) 15 to 35% by weight of a polyol;
(c) 13 to 35% by weight of a dibasic carboxylic acid; and
(d) 2 to 20% by weight of a 21-carbon dicarboxylic acid having the formula

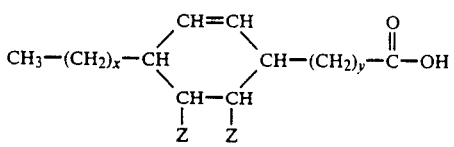

wherein X and Y are integers which when added together equal 12, and Z is a hydrogen (H) while the other Z is a carboxylic acid group (COOH).

3. The process of claim 1 wherein the unsaturated fatty acid is selected from the group consisting of tall oil fatty acid, soybean oil fatty acid, tung oil fatty acid, linseed oil fatty acid, linoleic acid, and linolenic acid, the polyol is selected from the group consisting of 1,4-butanediol, ethylene glycol, propylene glycol, neopentyl glycol, glycerol, trimethylolethane, trimethylolpropane, and pentaerythritol, and the dibasic carboxylic acid is selected from the group consisting of phthalic anhydride, ortho-phthalic acid, terephthalic acid, maleic anhydride, fumaric acid, azelaic acid, and dimer acid.

4. The product of the process of claim 1.

5. The product of the process of claim 2.

6. A solvent-borne alkyd resin composition comprising a fatty acid drying component, a polyol, and a dibasic carboxylic acid component wherein from 2 to 100% of the dibasic carboxylic acid component is a 21-carbon dicarboxylic acid having the formula

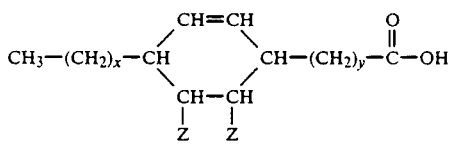

wherein X and Y are integers which when added together equal 12, and Z is a hydrogen (H) while the other Z is a carboxylic acid group (COOH).

7. The composition of claim 6 wherein the fatty acid drying component is selected from the group consisting of tall oil fatty acid, soybean oil fatty acid, tung oil fatty acid, linseed oil fatty acid, linoleic acid, and linolenic acid, the polyol is selected from the group consisting of 1,4-butanediol, ethylene glycol, propylene glycol, neopentyl glycol, glycerol, trimethylolethane, trimethylolpropane, and pentaerythritol, and the dibasic carboxylic acid component is further comprised of the group consisting of phthalic anhydride, ortho-phthalic acid, terephthalic acid, maleic anhydride, fumaric acid, azelaic acid, and said 21-carbon dicarboxylic acid.

8. The composition of claim 6 wherein the solids levels are up to 100%, based on initial reduction of the fatty acid drying component, the polyol and the dicarboxylic acid component.

9. A coating comprising the alkyd resin of claim 1 dissolved in a non-aqueous solvent.

10. A coating comprising the alkyd resin of claim 1 dissolved in a non-aqueous solvent and pigment dispersed therein.

11. A coating comprising the composition of claim 6 wherein said alkyd resin composition is a long-oil alkyd resin composition.

12. A coating comprising the composition of claim 6 wherein said alkyd resin composition is a medium-oil alkyd resin composition.

13. A coating comprising the composition of claim 6 wherein said alkyd resin composition is a short-oil alkyd resin composition.

* * * * *